United States Patent
Zietlow et al.

(10) Patent No.: US 6,793,953 B2
(45) Date of Patent: Sep. 21, 2004

(54) FOOD PRODUCT AND METHOD OF PREPARATION

(75) Inventors: Philip K. Zietlow, Wayzata, MN (US); Bernhard H. Van Lengerich, Plymouth, MN (US); Mathew F. Langenfeld, Rosemount, MN (US); Terry G. Reishus, Eagan, MN (US); James L. Stinson, Wayzata, MN (US); Gerald L. Wilson, New Hope, MN (US); Michael A. Helser, Plymouth, MN (US)

(73) Assignee: General Mills, Inc., Minneapolis, MN (US)

(*) Notice: Subject to any disclaimer, the term of this patent is extended or adjusted under 35 U.S.C. 154(b) by 187 days.

(21) Appl. No.: 10/142,535

(22) Filed: May 8, 2002

(65) Prior Publication Data

US 2003/0049360 A1 Mar. 13, 2003

Related U.S. Application Data (60) Division of application No. 09/264,589, filed on Mar. 8, 1999, now Pat. No. 6,432,460, which is a continuation-in-part of application No. 09/107,168, filed on Jun. 12, 1998, now Pat. No. 6,180,158.

(51) Int. Cl.[7] .............................. A23L 1/30; A23G 3/00
(52) U.S. Cl. ...................... 426/571; 426/572; 426/660; 426/516; 426/445; 426/470
(58) Field of Search .............................. 426/571, 660, 426/445, 470, 516, 572

(56) References Cited

U.S. PATENT DOCUMENTS

| | | |
|---|---|---|
| 2,847,311 A | 8/1958 | Doumak et al. |
| 2,926,121 A | 2/1960 | Hobbs et al. |
| 3,062,661 A | 11/1962 | Doumak |
| 3,345,186 A | 10/1967 | Kania et al. |
| 3,556,812 A | 1/1971 | Krohn et al. |

(List continued on next page.)

FOREIGN PATENT DOCUMENTS

| | | | |
|---|---|---|---|
| CA | 2317340 | * | 9/2001 |
| EP | 0 885 568 A1 | | 12/1998 |
| GB | 2 115 673 | * | 9/1983 |
| WO | WO 99/26491 | | 6/1999 |
| WO | WO 99/48379 | | 9/1999 |
| WO | WO 99/63837 | | 12/1999 |
| WO | WO 99/65321 | | 12/1999 |

OTHER PUBLICATIONS

Van Der Schaaf, The Mondomix Process for the Manufacture of Aerated Sugar Confectionery, Dec. 17, 1974.
Commercial Brochure Bepex Corporation, 1992.

Primary Examiner—N. Bhat
(74) Attorney, Agent, or Firm—John A. O'Toole; Everett G. Diederiks, Jr.; Douglas J. Taylor (57) ABSTRACT

A method of preparing aerated food products, especially marshmallows, having a nutritionally fortified ingredient is provided. In accordance with a preferred form of the invention, the method includes the steps of: providing a liquid sugar confection blend comprising: a saccharide component; about 1 to 30% moisture; and a foam structuring agent; adding a dry particulate including a nutritional fortifying ingredient to the liquid confection blend; aerating the liquid confection blend to form an aerated confection plastic foam; extruding the aerated foam at a heated temperature to form an aerated confection extrudate; cooling the extrudate to solidify the confection to form a set aerated confection extrudate; forming the set aerated confection extrudate into pieces; and drying the pieces. The invention also concerns preparing a liquid confection blend seeded with a sweetener and a nutritional fortifying ingredient that can be used in making the aerated food products.

65 Claims, 5 Drawing Sheets

U.S. PATENT DOCUMENTS

| | | | |
|---|---|---|---|
| 3,607,309 A | | 9/1971 | Olney et al. |
| 4,120,627 A | * | 10/1978 | Abe .......................... 425/92 |
| 4,251,561 A | | 2/1981 | Gajewski |
| 4,410,555 A | | 10/1983 | Richardson |
| 4,415,595 A | | 11/1983 | Takemori et al. |
| 4,582,709 A | | 4/1986 | Peters et al. |
| 4,714,620 A | | 12/1987 | Bunick et al. |
| 4,749,575 A | | 6/1988 | Rotman |
| 4,774,100 A | | 9/1988 | Markwardt et al. |
| 4,785,551 A | * | 11/1988 | Meyer ........................ 34/368 |
| 4,913,924 A | | 4/1990 | Moore |
| 4,925,380 A | | 5/1990 | Meisner |
| 5,019,404 A | * | 5/1991 | Meisner .................... 426/249 |
| 5,030,460 A | | 7/1991 | Baggerly |
| 5,429,830 A | | 7/1995 | Janovsky et al. |
| 5,451,419 A | | 9/1995 | Schwab et al. |
| 5,462,760 A | | 10/1995 | Serpelloni et al. |
| 5,476,678 A | | 12/1995 | Walter et al. |
| 5,532,017 A | * | 7/1996 | O'Donnell et al. ......... 426/571 |
| 5,580,601 A | | 12/1996 | Ribadeau-Dumas et al. |
| 5,587,198 A | | 12/1996 | Cherukuri et al. |
| 5,789,002 A | | 8/1998 | Duggan et al. |
| 6,110,511 A | | 8/2000 | Rollins et al. |
| 6,180,158 B1 | * | 1/2001 | Zietlow et al. ............. 426/571 |
| 6,197,355 B1 | * | 3/2001 | Zietlow et al. ............. 426/289 |
| 6,387,432 B1 | * | 5/2002 | Zietlow et al. ............. 426/571 |

* cited by examiner

FOOD PRODUCT AND METHOD OF PREPARATION

CROSS REFERENCE TO RELATED APPLICATION

This application represents a divisional application of U.S. Ser. No. 09/264,589 filed Mar. 8, 1999 now U.S. Pat. No. 6,432,460 which is a continuation-in-part application to U.S. Ser. No. 09/107,168 filed Jun. 12, 1998, now U.S. Pat. No. 6,180,158.

FIELD OF THE INVENTION

The present invention is directed generally to food products and to their methods of preparation. In particular, the present invention is directed to improved aerated confectionery products such as marshmallows fortified with a nutritionally fortifying ingredient such calcium and to processes for making such improved fortified aerated, confectionery products.

BACKGROUND

Aerated confections are popular food items. Some aerated confections comprise a fat constituent while others are substantially free of such fat constituents. An illustrative fat free aerated confection is the common marshmallow. Such marshmallow products are familiar in both larger and smaller sizes.

It is well know that such marshmallows when fresh are soft and pliable but will stale by losing moisture and become hard. Indeed, purposefully pre-dried aerated confections are also well known. These products, particularly in smaller or bit sizes, are commonly added to certain popular Ready-To-Eat ("RTE") breakfast cereals, particularly those marketed to children. Due to their small size (i.e., having a number count of 4 to 6/g), these dried aerated confectionery marshmallow products are sometimes colloquially referred to as "Mar." bits or "marbits". The marbits must be pre-dried prior to admixture with the RTE cereal in order to reduce unwanted moisture migration from the marbit to the cereal and thus to forestall the multiple problems resulting therefrom.

While there are many types of marshmallow on the market, their methods of preparation generally fall into two main process groups: extruded marshmallow and deposited marshmallow. In both types, a sugar syrup and a structuring agent (such as an albumin, agar or, preferably a gelatin) are the two main ingredients. Typically, the sugar syrup is heated to reduce moisture and is thereafter cooled down, and then combined with the gelatin solution to form a slurry. That slurry is then aerated to form a foam, and after aeration, colors and flavors are then added to the foam. The particular marshmallow product may be formed into its final shape by an extrusion process. That is, after aeration, the foam is extruded through a die to form a rope. The die imparts the desired peripheral shape to the extrudate rope. The rope is allowed to rest briefly to set, and then is cut into desired sizes. For dried marshmallows, the process can additionally include one or more drying steps. (See, for example U.S. Pat. No. 4,785,551 issued Nov. 2, 1988 to W. J. Meyer entitled "Method of Drying Confection Pieces").

While marshmallows of a single color are most common, marshmallows having two or even a plurality of colors (collectively herein, "multi-colored") are also known (see, for example, D 376,039 issued Dec. 3, 1996 entitled "Food Product" showing a two color marbit design) as well as methods for their preparation. (See, for example, U.S. 4,925,380 issued Oct. 20, 1986 entitled "Multicolor Confection Extrusion System and 5,019,404 issued Feb. 28, 1990 entitled "Multicolor Confection Extrusion System", each of which are incorporated herein by reference). Both the '404 and '380 well describe the difficulties and sensitivities of such foam product preparation. The conventional processes for making multi-colored marshmallows teach to divide the aerated foam into a plurality of sub-streams, to admix a desired colorant to each sub-stream, and then extrude these colored sub-streams in substantially equal portions into a single rope or multiplicity of such ropes.

For adults, recent medical studies have indicated that a diet containing the U.S. recommended daily allowance (RDA) of calcium might be effective in preventing or mitigating osteoporosis, and also possibly high blood pressure and colon cancer. Calcium is also of particular nutritional value in growing children to support bone growth. There is therefore great public interest in the consumption of food products that will supply the recommended daily allowance of calcium.

In view of the desire for introducing more calcium into diets, especially children's diets, it would be desirable if such RTE cereal products were fortified with supplemental calcium to provide a significantly nutritionally enhanced product. By significantly nutritionally enhanced is meant a product having at least 10% of the current recommended daily allowance ("RDA") or at least 100 mg of calcium per 1 oz of RTE cereal serving.

Calcium can be added in limited amounts to the cereal pieces that comprise the principal ingredient of such marbit containing RTE cereal products. However, at higher levels of calcium fortification, the presence of such high amounts of calcium can adversely interfere with other desired characteristics. For example, high levels of added calcium materials could negatively affect the taste, texture and density of the RTE cereal pieces. It would thus be desirable to be able to calcium fortify the dried aerated confection pieces to provide calcium fortification whether as the sole means of fortification or to supplement any calcium fortification of the cereal pieces.

Methods for preparing candies and confections, especially aerated confections such as marshmallows, often involve the preparation of concentrated sugar syrup. Traditionally, the preparation of a sugar syrup involve three separate steps including (1) admixing dry sucrose and corn syrups with water to form a slurry, (2) heating to boiling to dissolve the sugars, (3) evaporating moisture to concentrate the syrup to the desired solids concentration. Generally, these steps are performed as separate steps and in batch mode. Batch processing allows for close control over the extent of crystals in the concentrated sugar syrup.

For example, sugar, water and corn syrup are first blended in an agitated kettle to form a slurry. Then, the slurry is heated in the kettle with agitation for an extended time to dissolve the sugar to form dilute sugar syrup. Next, the sugar syrup is concentrated such as by flash evaporation in a separate piece of equipment or by boiling for extended times in the kettle to achieve a concentrated sugar syrup of the desired moisture level.

Unfortunately, sugar syrups containing calcium, especially calcium supplied by highly water soluble calcium ingredients, when cooked or exposed to the elevated temperatures for extended cook times typical of marshmallow production can develop off-flavors Moreover, the type and extent of agitation and rate of concentration are carefully controlled to achieve desired levels of sugar crystals in the syrup. The presence or absence of seed crystals or other nuclei such as from calcium ingredients in the concentrated sugar solution profoundly influences the properties of the finished product such as the texture of a dried marshmallow. As a result, the batches of concentrated sugar syrup have a limited "pot life," i.e., must be used within a short time (e.g., 15 to 60 minutes).

In view of the present state of the art, there is a need for calcium fortified aerated confections as well as to methods for their manufacture.

The present invention provides improvements in aerated confections to calcium fortified products and to methods for preparing aerated confections that involve preparing sugar syrups, and improvements to methods for preparing aerated confections.

In particular, the present invention provides improvements to the compositions that are described in copending commonly assigned U.S. Ser. No. 09/107,170 entitled "Multi-Colored Aerated Confectionery Products and Processes for Making" filed Jun. 11, 1998 which is incorporated herein by reference. The present invention also provides improvements to the methods for preparing aerated confections that are described in co-pending commonly assigned U.S. Ser. No. 09/107,168 filed Jun. 9, 1998 entitled "PROCESS FOR AERATED CONFECTION" which is also incorporated herein by reference.

The present invention resides in part in the selection of calcium material of particular type and size to provide the desired calcium fortification. Also, a further improvement is that the present invention contemplates addition of calcium with solid sugar in a separate seeding step practiced after concentrating and cooling of the sugar syrup and before aeration whereby close control over end product texture can be obtained.

An advantage of the present invention is that the limited and irregular pot life feature of batch processing can be in certain embodiment replaced by continuous processing to produce concentrated sugar syrups in short residence times of 1 to 5 minutes.

Still another advantage is provided by employing a separate seeding step whereby the sugar crystal properties of the sugar syrup can be closely controlled by simple control over the properties of the sugars being added.

Still another advantage resides in the close control over the texture of aerated confections provided by the present methods by virtue of the seeding of clear sugar syrups with calcium immediately prior to aeration.

SUMMARY OF THE INVENTION

In its product aspect, the present invention resides in aerated confections importantly characterized by being nutrient fortified.

The aerated confections comprise:
About 50 to 95% of a saccharide component;
About 1 to 30% moisture;
About 0.5 to 30% of a structuring agent; and,
About 0.01% to 35% of nutritional fortifying ingredient selected from the group consisting of biologically active components, fiber, micronutrients, minerals, and mixtures thereof.

The confection compositions have densities of 0.10 to 1.0 g/cc.

Novel marbits products are also provided that are fabricated from such aerated confection compositions additionally characterized by a size count of 3 to 6/g and having moisture content of 1 to 5%. These products can be of one color or multi-colored.

In its principal method aspect, the present invention provides a continuous method for preparing an aerated confection, comprising the steps of:

A. Providing a cooled slurry confectionery blend comprising:
   About 50 to 95% of a saccharide component;
   about 1 to 30% moisture; and,
   About 1 to 30% (dry weight basis) of a foam structuring agent;

B. Adding seeding the liquid sugar slurry confection blend with about 0.01% to 45% of a dry particulate having a particle size distribution such that 90% have a particle size of less than 400 microns, to form a seeded liquid confection blend;

C. aerating the seeded liquid confection blend to form an aerated confection plastic foam having a density of about 0.1 to 1.0 g/cc and a temperature of about 90 to 180° F. (32 to 82° C.);

D. extruding the aerated foam at a temperature of about 90 to 180° F. (32 to 82° C.) to form a plastic aerated confection extrudate;

E. cooling the extrudate to set the confection to form a set aerated confection extrudate; and, F. forming the set aerated confection extrudate into pieces.

DETAILED DESCRIPTION OF THE INVENTION

The present invention provides improvements in aerated confections and to methods for preparing aerated confections. Each of the composition ingredients and steps of the present methods are described in detail below.

Throughout the specification and claims, percentages are by weight and temperatures in degrees Fahrenheit unless otherwise indicated.

Aerated Confection

The present invention provides novel food products such as aerated confectionery composition and products prepared therefrom that are nutritionally fortified. By "aerated confection product" is meant an aerated solid confectionery food product, especially in solid form, having a density in the range of from about 0.10 to about 1.0 g/cc and comprising from, from about 1 to about 30% of water, based on the total weight of the aerated confection product.

The aerated confectionery compositions and products fabricated from such compositions essentially comprise about 50 to about 95% of a saccharide component as the principle ingredient. Preferably, the saccharide component is used at about 70% to 90% of the confectionery compositions.

The saccharide component can include pure monosaccharide dextrose (e.g., anhydrous, monohydrate or dextrose syrup) and disaccharide sugars such as sucrose, and fructose, as well as hydrolyzed starch syrups such as corn syrup which include dextrin, maltose and dextrose, invert sugar syrups which include levulose and dextrose and/or converted fructose or glucose syrups. A portion of the saccharide component may be supplied by impure or flavored saccharidic ingredients such as fruit juices, purees, honey nectars, concentrated fruit juices, fruit flavors and mixtures thereof. The saccharide component can also include polysaccharides such as cornstarch.

In still other variations, the saccharide component can be provided in part by inulin or other fructo oligo saccharides ("FOS") materials. Good results are obtained when the present compositions contain 0.1% to 25% inulin or other FOS materials. Inulin is well known and is a staple of commerce. Inulin is a particularly useful β-2-fructofuranose material. Inulin is a well known material long used as a food supplement. Inulin is a carbohydrate material derived from a variety of crops importantly from Jerusalem artichoke and chicory. However, inulin is known for use as a prebiotic, that is, a food material that is metabolized in the intestine by desirable bacteria such as bifidus and lactobaccilus. The promotion of desirable intestinal flora is thought to be related to a variety of health benefits.

Generally, inulin is the clean, dried fibrous material which is separated by extraction from, for example, chicory, onions and Jerusalem artichokes and other common plant sources. Inulin is available in various commercial grade varieties. Pure inulin is commercially available from, for example, Rhone-Poulenc in the U.S. under the trade name RAFTILINE® and from Imperial Suicker Unie, LLC in Europe. Pure inulin has an average degree of polymerization ("DP") of about 9 to 10. Less preferred for use herein are less pure inulin source materials such as a dried Jerusalem artichoke flour, deflavored onion flour and mixtures thereof. Also useful herein are oligofructose materials available under the RAFTILOSE trade name from Rhone-Poulenc. Such materials are plant derived and have a DP of about 2 to 7, i.e., with fructose claims of up to about seven fructose units.

The β-2-fructofuranose material useful herein includes oligomers and polymers thereof. Particularly useful in terms of cost and availability are inulin and fructoogliosaccharides ("FOS") and mixtures thereof.

FOS materials are also available commercially such as from GTC Nutrition Company, Westminster, Colo. FOS materials have an average degree of polymerization ("DP") ranging from about 2–4 polyfructans.

While in the balance of the present description the use of inulin is described, the skilled artisan will appreciate that other β-2 fructofuranose materials described above can be used in full or partial substitution for the particular inulin materials described as can be other oligosaccharides, e.g., oligomanans.

The confection essentially further includes about 0.5 to 30%, preferably about 1 to 4%, and most preferably about 2.5 weight percent of a foam structuring or gelling component. Suitable structuring components inlude such as whipping agents (e.g., soy proteins, albumen, sodium caseinate, whey protein malted milk, and mixtures thereof), and hydrocolloid colloids such as pectin, gelatin, modified starches, gums and mixtures thereof. For products to be marketed in North America, the preferred structuring agent is gelatin. The gelatin can be derived from bovine, porcine, or piscine (fish) sources or can be of mixtures thereof.

The present compositions and articles fabricated therefrom essentially further comprise about 0.01% to about 25% of a fortifying ingredient in dry particulate form. The nutritional fortifying ingredient can be selected from the group consisting of biologically active components, fiber, micronutrients, minerals, and mixtures thereof. Suitable biologically active components can comprise nutricueticals, medicinal herbs (e.g., St. John's wort, rose hips), therapeutic or ethical drugs such as prescription drugs, and mixtures thereof. Nutriceuticals can include both heat-sensitive (such as soy isoflavones and certain botanicals) and heat tolerant materials (e.g., ribosome, chromium picolinate). Fiber can include both soluble and insoluble and mixtures thereof. Preferred micronutrients are selected from the group consisting of vitamins, trace elements (e.g., selenium, chromium, copper, manganese, iron, zinc,) and mixtures thereof. Preferred minerals include calcium, phosphorus (e.g., from phosphates), magnesium and mixtures thereof. Minerals and trace elements differ in concentration with trace elements typically being measured in ppb. The skilled artisan will also appreciate that some materials can have multiple functionality. For example, chromium pico linate is not only a nutriceutical but also a bioavailable source of chromium.

The nutritional fortifying ingredient is preferably added in dry form as part of the seeding step described below. More preferably, the nutritional fortifying ingredient is added in the form of a fine powder as part of the seeding step described below having a particle size such that 90% has a particle size of less than 150 micron, preferably 100 $\mu$m or most less in size.

In highly preferred embodiments, the present products comprise a calcium ingredient of defined particle size in an amount effective to provide the desired calcium enrichment. Good results are obtained when the present aerated confectionery compositions comprise sufficient amounts of calcium ingredients to provide the total calcium content of the composition to from about 50 to 2500 mg per 28.4 g (1 oz) serving (dry basis) (i.e., about 0.15% to 10% by weight, dry basis) of calcium, preferably about 100 to 1500 mg Ca per 28.4 g (1 oz.), and more preferably about 200 to 1500 mg Calcium/oz.

Useful herein to supply the desired calcium levels are calcium ingredients that supply at least 20% calcium. For example, a good calcium ingredient herein is calcium carbonate in that calcium carbonate comprises about 40% calcium. While expensive, food grade calcium carbonate obtained by chemical reaction processes is desirable due to low levels of impurities. A good, inexpensive source of calcium carbonate from natural sources is ground limestone. Care should be exercised in selecting sources of ground limestone that are low in trace metals, especially such heavy metals such as lead. In particular, it is desirable that the ground limestone has trace metal concentrations of less than 10 PPM. Useful levels of calcium carbonate range from about 0.5% to 25% in the finished product. Such calcium material levels insures that the calcium content in the finished product ranges from about 50 mg to 2500 mg/oz Also useful herein are insoluble mineral calcium salts, particularly calcium phosphate salts. Such calcium phosphate salts provide high levels of calcium and are relatively inexpensive. Moreover, such calcium phosphate salts can be used to provide calcium at high fortification levels with an acceptable taste. Calcium phosphate is generally available as a monobasic $(CaH_4(PO4)_2.H_2O)$, dibasic $(CaHPO_4.2H_2O)$ or tribasic $(Ca_3 (PO_4)_2)$ salts. Preferred for use herein is tricalcium phosphate, $Ca_3(PO_4)_2$, ("TCP") because of its high weight percentage of calcium (about 38%).

A useful tricalcium phosphate starting material is also known as tribasic calcium phosphate or tricalcium orthophosphate and is available in food chemicals codex grade from Monsanto or Rhone Poulenc, having the general formula $3Ca_3 (PO_4)_2.Ca(OH)_2$. This product provides assayed calcium content of from 34 to 40% by weight. Less preferred but nonetheless useful herein is anhydrous dicalcium phosphate, also known as anhydrous dibasic calcium phosphate, having a formula of $CaHPO_4$. An anhydrous dicalcium phosphate material is also available from Stauffer in food chemical codex grade, providing an assay calcium content from about 30 to about 31.7% calcium by weight. Other calcium phosphate hydrates also can be useful, including, but not limited to, calcium pyrophosphate, calcium hexametaphosphate and monobasic calcium phosphate.

The skilled artisan will appreciate that while these calcium phosphate salts are characterized herein as insoluble, of course, some small percentage will dissolve in water depending in part upon the temperature and pH.

Less preferred for use herein but nonetheless useful are other organic calcium salts including calcium ascorbate, calcium citrate, calcium gluconate, calcium lactate, and calcium sulfate. Also useful herein are the calcium citrate malate complexes described in U.S. Pat. No. 5,186,965 entitled "Calcium Citrate Malate Compositions" (Feb. 16, 1993) which is incorporated herein by reference. Such organic calcium salts are less preferred primarily based upon cost considerations.

Soluble calcium salts typically are expensive and contain low weight percentages of calcium. While calcium chloride is an exception to this generalization, addition of significant calcium levels supplied by calcium chloride imparts an unacceptable bitter flavor to microwave popcorn products. In addition, by adding sufficient amounts of many of these calcium salts to achieve the desired fortification level, the finished product may exhibit an undesirably dry texture and gritty mouth feel.

Preferred for use herein are calcium ingredients selected from the group consisting of food grade calcium carbonate, ground limestone, calcium phosphate salts and mixtures thereof.

The calcium ingredient regardless of source or type is further essentially characterized by a particularly fine particle size. Such a fine or flour form of the calcium ingredient provides a particle size such that the average particle size is less than 25 $\mu$m. Selection of such a fine particle size allows for inclusion of the particulate material without imparting an undesirable gritty mouthfeel.

Even more preferred for use herein-are calcium ingredients having a mean particle of less than 15 $\mu$m and for best results less than 10 $\mu$m. A good material, for example, is ground limestone of high purity having an average particle size of 3.8 $\mu$m available from Pluess-Stauffer (California), Inc. (Lucerne Valley, Calif.).

In certain highly preferred embodiments, the compositions and articles fabricated therefrom comprise the combination of inulin and calcium. It is believed that the presence of inulin aids in the absorbtion or bioavailability of calcium. In these variations, the compositions can comprise about 0.1% inulin and sufficient amounts of a calcium ingredient to provide a total calcium concentration of about 50 to 2500 mg calcium per 28.4 g. it is most surprising to be able to provided an aerated food product of desirable organoleptic attributes that contain such high levels of both calcium and inulin.

The present aerated confectionery compositions can range in moisture content about 1 to 30%. In one variation, the aerated confections can be in the form of a soft marshmallow defined in part by a moisture content of about 10 to 30%, preferably 12 to 18%.

In another variation, the marshmallows are dried to form dried frangible compositions having a moisture content ranging from about 2–5%.

In one preferred embodiment, the marshmallows are fat free, i.e., have fat contents of less than 0.5 percent (dry weight basis). In these embodiments, the fat level is provided by lipid content associated with one or more ingredients as compared to addition of a fat component. In other variations, e.g., chocolates, the aerated confection can comprise an added fat constituent such as about 1 to 10% cocoa butter, dairy fat or dairy fat containing (e.g., cheese) or other edible fatty triglyceride or fat mimics such as sucrose polyesters.

The confections' compositions have densities of 0.10 to 1.0 g/cc, preferably about 0.1 to 0.4 g/cc.

The compositions can be optionally flavored and/or colored to provide uniform products or products having phases of variously colored and flavored potions. By "color" is meant a confection of any color, including white, which may be provided by the base confection ingredients, and by additional artificial or natural coloring agents. "Color" also includes various hues or shades, e.g., pink and red.

In preferred embodiments, the aerated confections can comprise about 1% to 15% cornstarch resulting from the starch application step practiced as described below.

Novel marshmallow pieces such as marbit articles are also provided being fabricated from the present compositions and additionally characterized by a size count of 3 to 6 pieces per gram.

Method of Preparation

The invention further provides processes for making the above-described fortified aerated confection compositions and products. The process essentially includes adding or admixing the liquid confectionery blend with a dry solid material such as with 1) a nutritional fortifying ingredient in the form of a fine dry particulate alone or in combination with 2) dry sugar crystals prior to the aeration step. The nutritional fortifying ingredient is selected from the group consisting of nutricueticals, an insoluble calcium material, fiber, and mixtures thereof.

In the preferred embodiment, individual colors are added to individual streams of a single continuous stream or batch(es) prior to aerating the product. This results in advantages of having a product that is easier to control because the step of aeration is essentially the last step prior to extruding.

Figure 1:
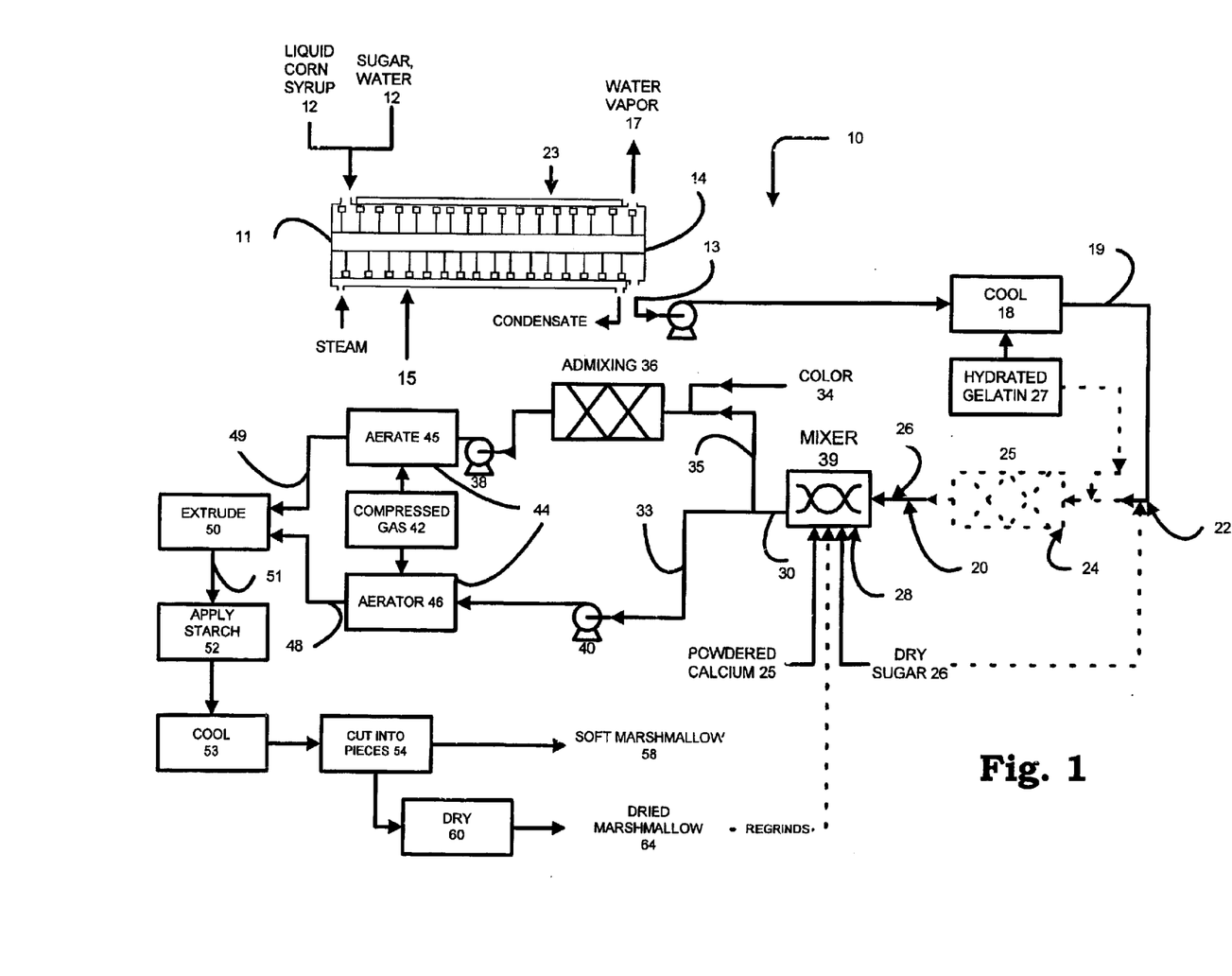
FIG. 1 is a schematic process flow diagram of one preferred embodiment of the present method of preparation.

Referring now to the drawing, FIG. 1 shows a schematic flow diagram of a preferred embodiment of the present method referred to generally by reference numeral 10. As illustrated, the present methods 10 include an essential initial first step 20 of providing a cooled confectionery blend 26. By "cooled" is meant at a temperature suitable for admixing a foamm structuring ingredient such as gelatin This step 20 can conveniently involve the sub-steps of 22 providing a cooled concentrated preferably substantially clear sugar syrup 19 and admixing or blending 24 a foam structuring agent therewith to form the cooled liquid confectionery blend 26.

Blend provision step 20, and more particularly sugar syrup provision substep 22, can comprise a substep of admixing 11 a plurality of sweeteners 12A in a first mixing zone of a vessel 14 including at least one or a first nutritive carbohydrate sweetener(s), preferably in a dry solid form, and at least a second nutritive carbohydrate sweetener, preferably in liquid form such as a sugar syrup (i.e., an aqueous solution of a nutritive carbohydrate sweetener) to form a blended sugar syrup slurry and sufficient amounts of water 12B to dissolve any dry sugar(s). Good results are obtained when the blended sugar syrup slurry prior to being concentrated has a moisture content ranging from about 20 to 30%, preferably about 20 to 25%. Of course, the moisture of the sugar syrup such as liquid corn syrup provides a portion of the moisture content of the blended sugar syrup slurry.

The dry solid sugar can be provided by any conventional nutritive carbohydrate sweetening agent including sucrose, dextrose, corn syrup solids, fructose, dried honey, and mixtures thereof. Preferred for use herein is sucrose.

The starting material liquid sugar syrup is preferably corn syrup but can be supplied by any convenient dissolved sweetener including liquid sucrose (e.g., sucrose dissolved in 30% water), invert sugar syrup, honey, hydrolyzed starch syrups (such as corn syrup, high fructose corn syrup, maltose syrup), fruit juices, concentrated fruit juices (e.g., 34° to 60° Brix), fruit purees, concentrated fruit purees and mixtures thereof. Selection of the dry sugar(s) as well as the sugar syrup and their relative proportion depend importantly upon the composition of the finished confection products prepared herein and the finished product attributes desired.

While the liquid sugar syrup can be added at ambient temperature, conveniently, the liquid sugar syrup starting material can be heated to a feed temperature ranging from about 120 to 200° F. (50 to 95°), preferably about 120 to 160° F. (50 to 71° C.). The dry sucrose is conveniently added at ambient temperature. The water 12B can be added at ambient temperature or heated up to boiling (212° F.).

Step 20, and particularly substep 22, can further includes a substep of cooking 15 the blended sugar syrup slurry to dissolve any sugar(s) in dry form to produce a clear blended sugar syrup. By "clear" is meant syrup that is substantially free of any undissolved sugar crystals.

Step 20, and particularly substep 22, can still further include a substep 23 of concentrating the clear blended sugar syrup to form concentrated clear blended sugar syrup 13. By the addition of indirect heat such as steam 68 fed to the jacket of the cooking vessel 14 or less preferably other heating fluids, water is evaporated from the clear sugar syrup as water vapor 17 that is vented to atmosphere. If desired, a vacuum can be pulled onto the vessel (e.g., 2 to 29 in. $H_2O$; 3 to 750 mm Hg) such as by pulling the evaporate to a condenser. Steam condensate 70 is also drained from the vessel's jacket.

Good results for the production of dried marbits, for example, are obtained when in step 20, the concentrated clear blended sugar syrup 13 comprises:

| Ingredient | Weight % | Preferred Range | Most Preferred |
|---|---|---|---|
| Sucrose | 52 to 98% | 68 to 82 | ≈75% |
| Corn syrup | 0 to 30% | 10 to 20% | ≈15% |
| Moisture | 2 to 18% | 8 to 12% | ≈10% |

The exit or discharge temperature of the concentrated clear sugar syrup so formed depends importantly upon the solids content or conversely, the moisture contents. At a low solids level of 82° Brix (18% moisture) the temperature can be 220° F. (104° C.) at atmospheric pressure; up to 320° F. (160° C.) at 98° Brix (2% moisture). The boiling temperature can be reduced modestly by reducing the pressure within the vessel 14 by pulling a modest vacuum.

Equipment suitable for practicing the cooking substep is commercially available. Suitable for use herein is any mixing device, whether batch or continuous, having heat transfer means. Preferred for use to practice the cooking step is a heated agitated cooking vessel such as is available from Bepex Corporation. The vessel is a jacketed horizontally extending apparatus having a rotating axially aligned interior shaft having a multitude of adjustable paddles extending radially from the shaft. The rotating paddles act as a mechanical agitator and toss the dry sugar material upward thereby exposing the suspended material to the wet sugar syrup. The paddle arrangement and agitator tip speed combine to move the sugar material in a thin annular spiral from the inlet to discharge of vessel 14. The Bepex heated vessel or "turbolizer" is preferred since it is a relatively simple and thus less expensive piece of equipment. Less preferred but nonetheless also suitable for use herein to practice the cooking step is a conventional swept surface heat exchanger. While useful, a swept surface heat exchanger is less desirable since it is a more complicated and thus more expensive piece of equipment compared to a heated turbolizer. In still other variations, one or more kettles can be used to practice the cooking step.

The residence time ("Rt") within the cooking vessel 14 is preferably short ranging in the preferred embodiments from about 0.5 to five minutes, preferably about 1 to 2 minutes.

As a result of the short exposure time to high temperatures, an advantage of the present invention is that all or a portion of either the dry or liquid sugar can be supplied by fruit juices or sources such as fruit juice, fruit juice concentrate, fruit nectars, fruit purees, fruit puree concentrate, honey, and mixtures thereof. In certain embodiments, the clear sugar syrup 14 can comprise about 1 to 30% (dry basis) of flavor carrying sugar supplied from fruit sources. Shorter residence times within the cooking vessel in practicing substep 15 are especially desirable when fruit materials supply a portion of the sugar solids to minimize the loss of desirable flavor.

The residence time within the cooking vessel 14 can be adjusted by modifying the angle of the paddles, adjusting flow rates, shaft rotational speeds, and rate of heating, and various combinations.

The operating pressure the cooker of the can be open to the atmosphere. If desired, however, a vacuum of several inches of water can be applied to lower the boiling point temperature of the sugar syrup.

It will be appreciated that the admixing, cooking and concentrating sub-steps while described separately are performed with some overlap between the sub-steps within cooking vessel 14 as the syrup advances from the vessel's inlet to its discharge.

Figure 3:
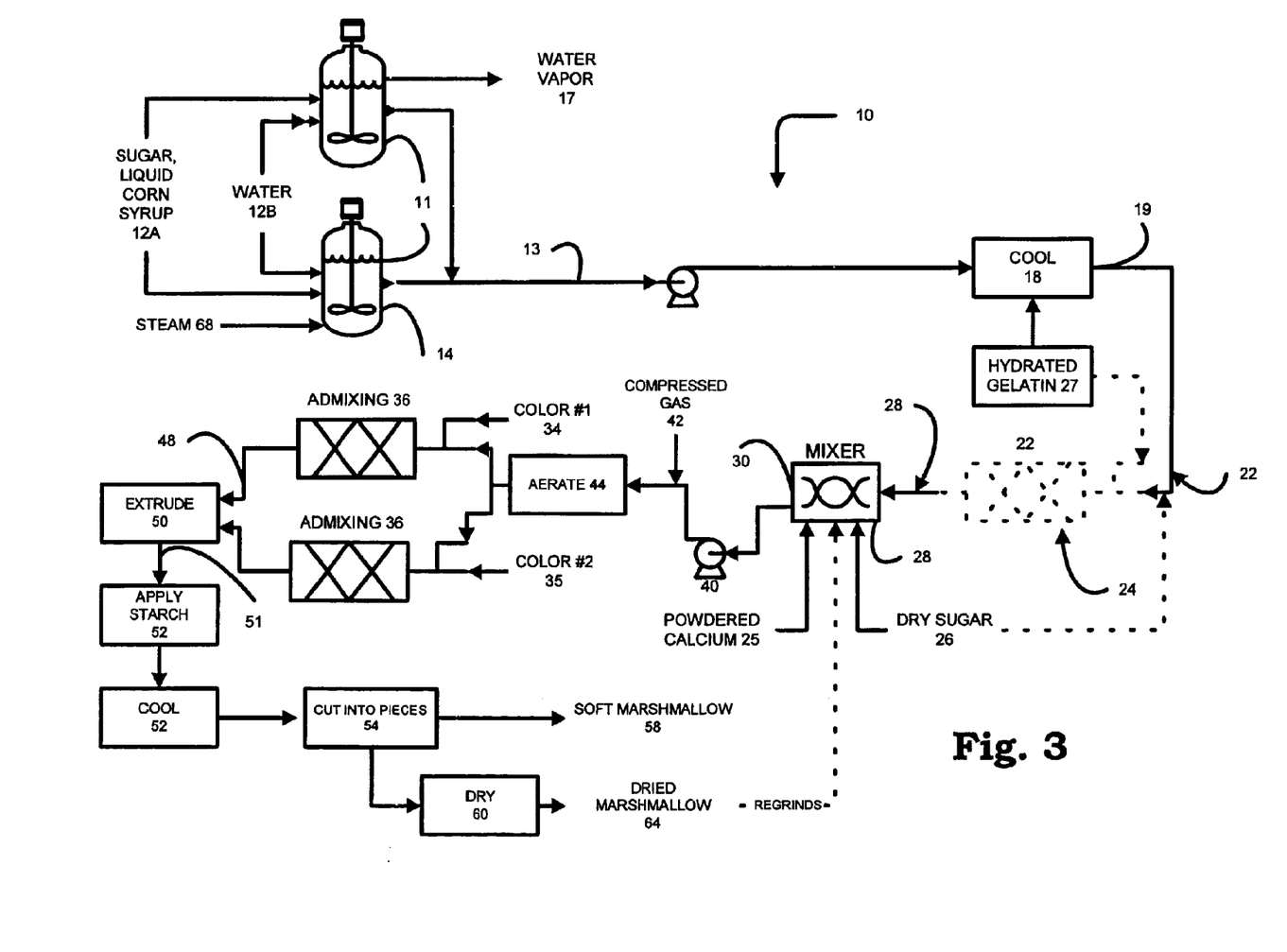
FIG. 3 is a schematic process flow diagram of a variation of the embodiment of FIG. 2 involving batch processing to practice a portion the step of providing a cooled slurry blend.
Figure 4:
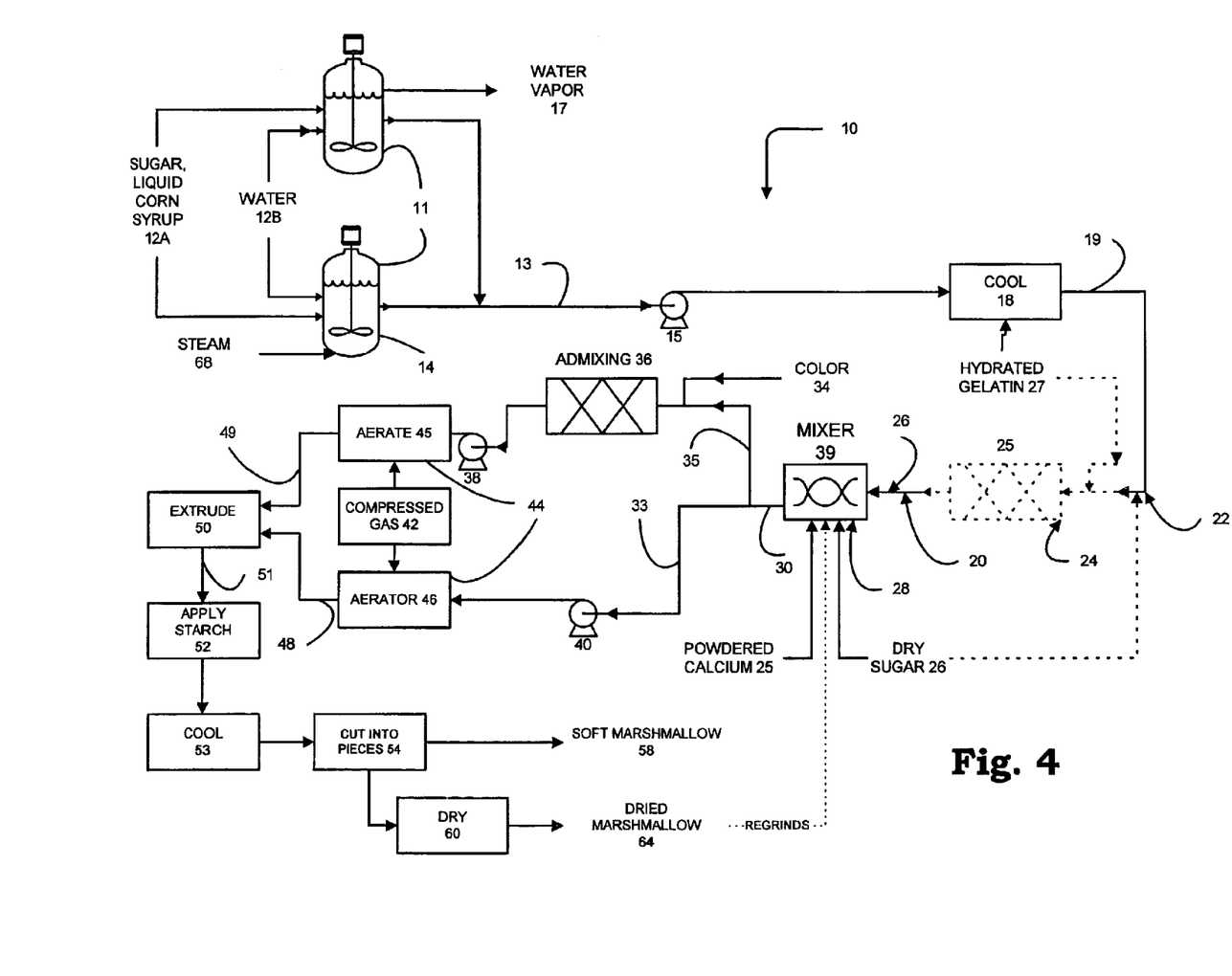
FIG. 4 is a schematic process flow diagram of a variation of the embodiment of FIG. 1 involving batch processing to practice a portion the step of providing a cooled slurry blend and pre-aeration color addition.
Figure 5:
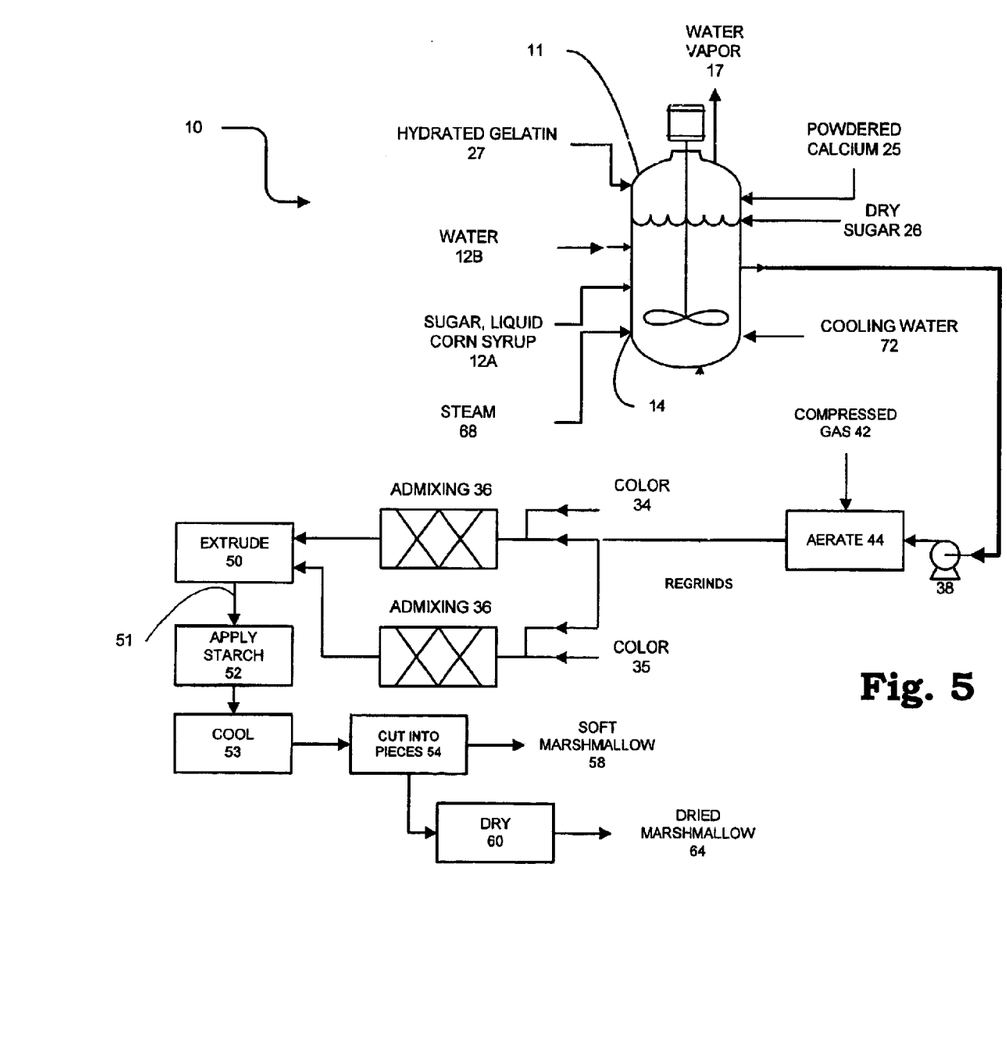
FIG. 5 is a schematic process flow diagram of a variation of the embodiment of FIG. 2 involving batch processing to practice a portion the step of providing a cooled slurry blend and post-aeration color addition.

In another less preferred but none-the-less useful embodiment of the present invention that is illustrated in FIGS. 3–5, one or more batch operations employing kettles 14 are used to practice the sub-steps of cooking 15 and concentrating 23 the sugar syrup. In these embodiments, a single kettle or batch can be made up one at a time. In a semi-continuous variation, a plurality of kettles or batches are made such as the two shown in FIG. 3 to provide a continuous stream of concentrated cooked clear sugar syrup. In still other variations, not shown, the cooling step and/or gelatin addition step can also be practiced using the same preparation kettle. In still other variations, the different kettles can be used to provide syrups that vary purposefully. For example, one batch can be of one color and a second of a second color. The batches can also vary to provide different eating qualities. The syrups of different properties can be purposefully mixed or fed in separate parallel steams (not shown) to be combined finally in the extrusion step 50 to be described.

The clear concentrated sugar syrup 13 finds particular suitability for use as an intermediate product in the manufacture of confections, especially aerated confections such as marshmallows, especially dried marshmallows.

In preferred embodiments, blend provision step 20 can further comprise a step of cooling 18 the concentrated clear sugar syrup 13.

The clear concentrated sugar syrup 13 can be cooled 18 while minimizing the formation and growth of sugar crystals from an incoming temperature that can range from about 220 to 320° F. (104.5 to 160° C.) to a temperature suitable for addition of a foam structuring agent such as gelatin. When subjected to higher temperatures in sugar syrup, gelatin can exhibit degradation and loss of its foam structuring properties. Good results are obtained when the concentrated clear sugar syrup is cooled to a temperature of about 80 to 185° F. (26 to 85° C.), preferably 120 to 160° F. to form the cooled concentrated sugar syrup 19. Of course, when using a foam-structuring agent that is more heat tolerant, less cooling is required. Also, since gelatin degradation is a function of both temperature and time, shortening the duration of the process, particularly the post-cooling portion of the process, can allow for less cooling. Of course, if gelatin loss is acceptable, the liquid confection blend to-be formed can be formulated with extra gelatin to compensate for any gelatin loss through thermal degradation.

While not critical, a swept surface heat exchanger is preferred for use herein to practice the cooling substep 18. Such a heat exchanger forms a thin film on the cooling surface of the heat exchanger. A suitable device for this step sometimes referred to in the art as a "Votator" is described in U.S. Reissue Pat. No. 21,406 to C. W. Vogt, Mar. 19, 1940. Such equipment is commercially available from several food processing manufacturers. Also useful, but less preferred due to its cost, for use for practicing the cooling substep 18 is a twin screw extruder. In the present invention, the operating pressure of the twin screw extruder is much lower than on a conventional cooking twin screw extruder and ranges from about on the order of 0.5 to 5 psig (10 to 136 kPa), and preferably about 1 to 2 psig (115 to 136 kPa). Twin screw extruder usage for practicing this step is less preferred due to the higher cost of such equipment.

In still other variations of the present invention, an extruder having at least one screw such as a single or preferably a twin screw extruder can be used to practice in a single piece of equipment the entire process of providing a cooled liquid sugar syrup including the steps of admixing liquid and dry sugars; cooking to form a clear sugar syrup, and concentrating the sugar syrup to form the concentrated sugar syrup. Employment of a single piece of equipment, while expensive from an equipment capital cost, provides a simplified means of practicing the present methods. In still other variations, other equipment can be used to practice one or more of the steps or sub-steps herein. For example, a simple jacketed pipe or barrel with in-line static mixers or a hollow screw can be used to practice the cooking or cooling steps. In still another equipment variation, a simple heat exchange operated in a cooling mode can be used to practice the cooling step. In still other variations such as depicted in FIGS. 4 and 5, the cooling step can be practiced in the same make-up kettle(s).

The cooling substep 18 is preferably practiced to have a short residence time and generally ranges from about 0.25 to 10 minutes, preferably about 0.5 to 2 minutes.

The step 20 can further comprise the substep 24 of admixing the concentrated cooled sugar syrup 19 with about 1 to 30%, preferably about 1 to 4%, of a foam structuring agent (dry basis) to form a liquid confection slurry or blend 25. Suitable for use herein as the foam structuring agent or gelling component is a hydrocolloid ingredient such as pectin, gelatin, modified starches, albumen, gums and mixtures thereof. For products to be marketed in North America, the preferred structuring agent is gelatin especially from bovine and/or piscine sources although porcine gelatin can also be used. The foam-structuring agent can be dissolved or dispersed in a suitable carrier, preferably water.

Importantly, the heating and cooling steps, if practiced, are performed prior to addition of any heat sensitive foam structuring ingredient such as gelatin, except as described below wherein the gelatin is fed into the syrup as part of the cooling step.

The admixing substep 24 can thus involve adding an aqueous solution of structuring agent such as a gelatin-in-water solution or hydrated gelatin. Conveniently, the admixing can be practiced using an in-line static mixer 37. In another variation of the present methods, and as also depicted in FIG. 1., the cooling step 18 and admixture step 22 can be practiced at least in part simultaneously rather than sequentially. In this variation, all or at least a part of the gelatin slurry 20 can be added directly to the swept surface heat exchanger or other equipment used to practice the cooling step 18. In still another variation depicted in FIG. 5, the hydrated gelatin is added to the single make-up kettle once the cooling step is performed therein.

In certain preferred embodiments, the present methods further include the step of admixing 28 or seeding 28 the liquid confection blend 25 with dry particulate sugar crystals 26 to form a sugar seeded liquid confection blend 30. The sugar crystals 26 are preferably added to the liquid confection blend, i.e., after adding the gelatin structuring ingredient, and less preferably added to the cooled sugar syrup 19 (i.e., before addition of the gelatin) as indicated by the dashed line on FIG. 1. The admixture step can be practiced in a conventional blender or mixer 39. If desired, the admixture step can also be practiced in a twin screw extruder, whether alone or as described above, after preparing the cooled concentrated sugar syrup in a twin screw extruder.

The sugar crystals can be added at about 1 to 30%, preferably about 10 to 20% (dry weight basis), and most preferably about 15 to 17%. The sugar crystals should be less than 400 $\mu$m in size, preferably 300 $\mu$m or less in size. Powdered sugar having a mean particle size of about 10 to 30 $\mu$m can also be used. Sugar of the preferred particle size range is commercially available as "Baker's special" type of ground sugar. As the amount of ground sugar seeding increases, the finished dried confections' texture becomes desirably more frangible.

The present methods can further include the step of admixing 28 a calcium ingredient(s) or seeding 29 the liquid confection blend 24 with the nutritional fortifying material such as calcium materials 25 especially in dry powder. The calcium can be premixed with the dry powdered sugar, added separately (whether before or after the dry sugar addition) or both.

In another variation, the seeding step can involve the addition of about 0.01% to 25% of other nutritional additive materials in dry powder form to provide additional nutritional advantages. For example, a powdered fiber material whether soluble and/or insoluble, e.g., carboxymethyl cellulose and/or wheat bran can be added. Various nutriceuticals, especially those that are heat sensitive, e.g., soy isoflavones, botanicals, etc. Other biologically active ingredients, e.g., drugs, can also be added, if desired. Micronutrients such as vitamins and trace elements can be added. Small quantities of such nutritive materials can be dispersed in various particulate carriers such as starch. These materials can be added alone or in combination with the powdered calcium material(s). It is an advantage of the present process that addition of these materials as part of the seeding step and especially in the form of fine dry powders allows for incorporation with minimal impact on texture of the finished products. While not wishing to be bound by the proposed theory, it is speculated herein that the low moisture availability due to the sugar(s) levels combined with the short duration and low heat of the remaining preparation steps allow these materials to act as relatively inert fillers in the structure of the finished products.

Thereafter the nutritionally fortified sugar syrup liquid confection blend 30 in the preferred embodiment is pumped to an aerator and the present methods of preparing an aerated confection further essentially comprise the step of aerating 44 the blend 30 to form an aerated confection foam such as aerated foam stream 48.

If desired, the sugar seeded liquid confection blend can be divided into two or into any number of sub-streams such as a first and a second sub-stream 33 and 35 as depicted in FIG. 1.

The first sub-stream 33, for example, having no color added, is fed to a first aerator 45 such as by metering pump 40 to form the first aerated confection sub-stream 48 (X) having, for example, a white color. A color 34 is admixed to the second sub-stream and is fed by metering pump 38 to a second aerator 46 to form a second aerated confection sub-stream 49 ("γ") having a second color 35 that is different in color shade or hue from the first aerated confection sub-stream 48. Optionally, but preferably, the color admixture is facilitated by an in-line static mixer 36 that can be downstream of pump 38 or upstream of pump 38 as depicted in FIG. 1. In another variation, the admixture of the color 34 is performed by the whipping action of the aerating step 44 such as aerator 45 and all or a part of the color added directly to aerator 44. The ratio of seeded liquid confection to color ranges greatly depending upon the concentration of the liquid color. Good results are generally obtained when the ration of seeded liquid confection to color ranges from about 100 to 1000:1, preferably about 200 to 400:1, most preferably about 300:1.

Good results are obtained when the ratio of first sub-stream ($\chi$) to second sub-stream ("γ") ranges from about 1:1.1 to 1:50.

Importantly, in the preferred embodiment depicted in FIG. 1, each sub-stream has its own means for controlling the volume or amount of seeded liquid confection blend being fed to its respective aerator such as a metering pump. Also, each sub-stream has its own aerator.

Figure 2:
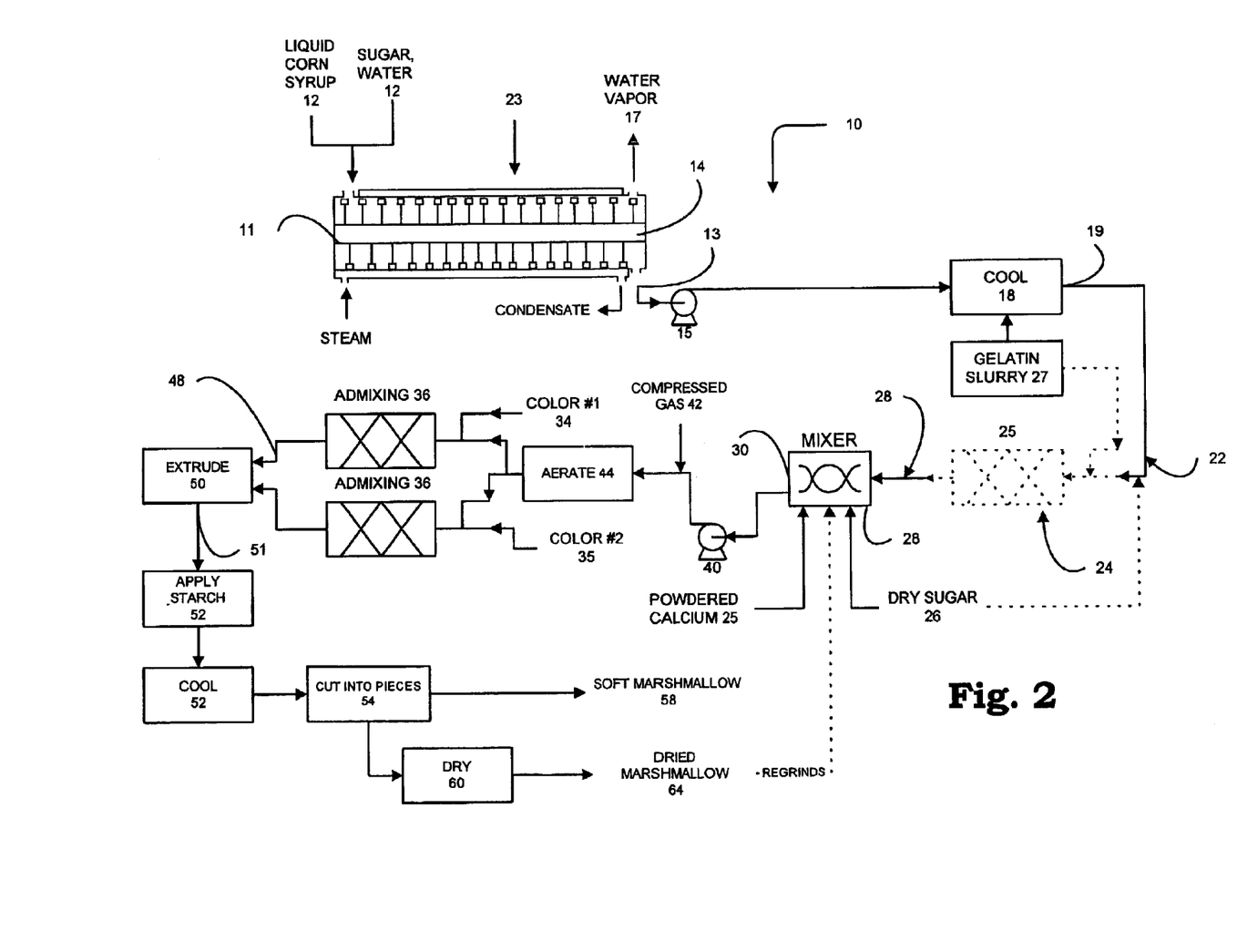
FIG. 2 is a schematic process flow diagram of an alternate embodiment of the present method of preparation involving post aeration coloring and flavoring of aerated foam.

Referring now briefly to FIG. 2, there is shown an alternate less preferred embodiment of practicing the present invention. Generally, the process there depicted is similar up to the aerating step. In the alternate embodiment depicted in FIG. 2, however, a single aerator is used to prepare a stream of aerated foam. This stream of aerated foam is divided into sub-streams of aerated foam. Colorant can then be added to one or more of the sub-streams to provide sub-streams of colored aerated foam. Having a single aerator to aerate the entire confection stream provides certain cost advantages relative to having multiple aerators.

Referring once again to FIG. 1, while more expensive than the post aeration addition of colorant that uses only a single aerator and less colorant, the present preferred embodiment of the present methods having a pump and aerator combination for each sub-stream allow for the production of multicolored marshmallows having disparately colored portions of substantially unequal proportion indeed, of substantially unequal proportion, e.g., 95% of one color ("$\chi$") and 15% of the second color ("γ"), or otherwise expressed, the present invention can provide marshmallows wherein the ratio of $\chi/\gamma \geq 1.1$ and even as high as $\chi/\gamma \cong 50$.

A compressed gas 42 is added to the liquid seeded sub-streams of confection blend 33, 35. Conveniently, just prior to entering the aerator(s), each supply portion or sub-stream 33,35 crosses a T-junction in the pipes where a gas supply injects gas into the batch. The gas 42 can be nitrogen gas or clean air or other suitable gas. By "clean air", it is meant a de-watered and de-oiled air. The gas is kept at room temperature and a suitable pressure such as at a pressure of 120 to 5,700 kPa (40 to 200 psig.). After the gas is injected at the T-junction, each of the sub-streams of confection blend along with the injected gas enters its respective aerator. In other variations, all or a portion of the compressed gas can be fed directly to the aerator.

The aeration step 44 forms foam or aerated confection sub-stream(s) having a density of about 0.1 to 1.0 g/cc, preferably about 0.15 to 0.5 g/cc. Preferably, the aerated foam is maintained at a temperature ranging from about 90 to 180° F., preferably about 140 to 150° F. If desired, the aerator (s) can include a cooling means (not shown) such as cooling water to remove the heat buildup that occurs during the aerating step.

One or more sub-streams 48, 49 of aerated confection are fed to an extruding head or equivalent and the present methods further essentially comprise the step of extruding and/or coextruding 50 the aerated confection at a pumpable temperature such as at about 105 to 150° F. (40 to 65° C.), preferably about 50 to 60° C. to form an aerated confectionery extrudate 51 such as a continuous plastic rope. The extrudate 51 can be characterized by a pattern including a peripheral shape such as a circle, star, animal figure or other shape including both regular and irregular shapes. The pattern can further include colorations including various internal portions or filaments. By "plastic" is meant that the temperature of the extrudate is above the set point temperature of the foam structuring agent. As a result, the rope of extruded foam is easily deformable at these elevated temperatures. In other variations, the foam can be deposited into means for forming shaped pieces such as conventional starch molds.

Conveniently, a starch coating can be applied 53 to the extrudate 51 to minimize the stickiness.

Thereafter, the present methods essentially include a cooling step 53 to allow the structuring agent to set and thereby to form an aerated confection such as a marshmallow. The marshmallow can have moisture content of about 5 to 30%, preferably about 5 to 20%, and more preferably about 5% to 15%.

The present methods can further comprise the step of forming or cutting 54 the cooled aerated confectionery rope into pieces of desired shape, size and moisture content.

In the manufacture of soft marshmallow or other soft confections, the finished fortified products soft marshmallow 58 so prepared are ready for conventional packaging for distribution for sale. Optionally, the soft marshmallow can be subjected to a modest drying step to adjust the moisture content within the moisture content range described herein.

However, in the preparation of a dried aerated confection, the present methods 12 additionally comprise a finish-drying step 60 to form dried marshmallow pieces. Any suitable drying technique, which will remove the moisture content to be about 2 to 4%, is adequate. A marshmallow drying method is taught in U.S. Pat. No. 4,785,551 entitled "Method of Drying Confection Pieces" which is incorporated herein by reference. The '551 patent teaches a rapid, five minute drying step using a two-step fluidized bed heating step.

In another technique preferred herein, the marbits are dried at a slower rate using forced hot air convection drying. For example, the pieces can be put on trays, mounted in a frame that holds about 30 to 40 trays, and rolled into a drying room until adequately dried. The drying room is kept at a warm temperature, for example, about 82.2° C. (180° F.). In other implementations, a conveyor through a drying room or tunnel transports the pieces until the desired moisture content is reached.

In a minor variation, broken pieces can be ground to form regrinds 80 that can conveniently be reused by adding back into the dry particulate addition step.

The resulting fortified dried pieces 64 can then be consumed as confections. The dried marshmallow pieces 64 find particular suitability for use as an appealing added component of food products that provides added or supplemental calcium fortification. For example, the pieces 64 can be added to a Ready-To-Eat ("R-T-E") breakfast cereal, especially sugar coated R-T-E cereals intended as children's breakfast cereals. In other variations, the confections provide appealing carriers for various ethical drugs, vitamins, minerals and the like. Due to the aerated and frangible texture, the confections are easy to chew and are quickly dissolving.

In a preferred embodiment, the finished RTE cereal can comprise about 65 to 99%, preferably of a conventional dried cereal (such as flakes, shreds, biscuits, puffs formed from a cooked cereal grain or dough of oats, wheat, corn, barley, rice or mixtures) and about 1% to about 35% by weight of the present novel dried calcium fortified confections 64, preferably about 20 to 30%. In still other variations, the present confections can be admixed with instant oatmeal, dry cocoa beverage mix (especially smaller sized pieces), and dry mixes for other products, e.g., gelatin dessert. The confections can also be used in cereal bar products, toppings for desserts such as ice cream or yogurt, or in various A further advantage of the present invention is that the dried marshmallow pieces 64 exhibit less hardness and greater frangibility resulting as a result of the dry sugar seeding step.

Dried marshmallow pieces 64 can be fabricated by the present methods that contain, for example, 5% of one color and 95% of a second color. Moreover, one or more of the disparately colored portions can be discontinuous rather than in a single continuous phase.

EXAMPLE 1

A nutritionally fortified aerated food product of the present invention is prepared having the following formulation:

| Ingredient | Weight % |
| --- | --- |
| Sucrose | 51.84 |
| Powdered Sugar | 16.80 |
| Dextrose | 9.46 |
| Calcium carbonate | 8.73 |
| Corn syrup (42 DE) | 8.70 |
| Gelatin | 1.75 |
| Color | 0.13 |
| Flavor | 0.15 |
| Moisture | Balance |

The calcium carbonate is supplied by ground limestone and is characterized by a particle size of such that more than 90% is less than 150 microns in size. The total heavy metals concentration is less than 10 ppb.

The density of the aerated confection is about 0.25 g/cc.

Marbit articles are prepared from this composition in the form of shaped pieces having about four to six pieces per gram. The compositions provide about 990 mg calcium per oz (28 g).

Compositions and articles of substantially similar texture and eating quality are prepared when in the above formulation tricalcium phosphate is substituted in whole or in part at equivalent calcium levels.

What is claimed is:

1. A method for preparing an aerated food product, comprising the steps of:
   A. providing a blend comprising:
      about 50 to 98% of a saccharide component;
      about 1 to 30% moisture; and,
      about 1 to 30% (dry weight basis) of a foam structuring agent;
   B. adding about 0.01% to 45% of a dry particulate including a nutritional fortifying ingredient to the blend;
   C. aerating the blend to form an aerated foam having a density of about 0.1 to 1.0 g/cc and a temperature of about 90 to 180° F. (32 to 82° C.);
   D. extruding the aerated foam at a temperature of about 90 to 180° F. (32 to 82° C.) to form an aerated extrudate;
   E. cooling the extrudate to form a set aerated extrudate; and,
   F. forming the set aerated confection extrudate rope into pieces.

2. The method of claim 1 wherein step B includes adding dry sugar crystals in an amount ranging from 1 to 30% (dry weight basis) having a particle size of less than 400 microns.

3. The method of claim 2 wherein step B includes adding about 0.01% to 15% of nutritional fortifying ingredient selected from the group consisting of biologically active components, fiber, micro-nutrients, minerals, and mixtures thereof.

4. The method of claim 2 wherein in step A at least a portion of the blend is a nutritive carbohydrate sweetener in the form of a dry particulate solid.

5. The method of claim 4 wherein at least a portion of the nutritive carbohydrate sweetener is sucrose.

6. The method of claim 5 wherein at least a portion of sucrose is in the form of a sugar syrup of liquid sucrose.

7. The method of claim 6 wherein at least a portion of step A is practiced at atmospheric pressure.

8. The method of claim 2 wherein the step A includes the sub-steps of:
   admixing to form a sugar syrup slurry:
      1) a first source of a nutritive carbohydrate sweetener,
      2) a second source of a nutritive carbohydrate sweetener in the form of a sugar syrup, 3) sufficient amounts of water to form a sugar syrup slurry having a moisture content of about 20 to 30%;

cooking the sugar syrup slurry with agitation and indirect heat to dissolve the solids, concentrating the sugar syrup by evaporating water as vapor and venting the vapor to form a concentrated clear syrup having a moisture content of about 2 to 18% and a discharge temperature of about 220 to 320° F. (104.5 to 160° C.).

9. The method of claim 8 wherein the extrudate is cooled to a temperature ranging from about 80 to 185° F. (26 to 85° C.).

10. The method of claim 8 wherein step A is practiced to cause the sugar syrup to traverse an annular spiral.

11. The method of claim 8 wherein in step A, at least a portion of the concentrating substep is practiced under a partial vacuum.

12. The method of claim 2 wherein at least a portion of the saccharide component is provided by a fructo oligo saccharide.

13. The method of claim 12 comprising about 0.1% to 25% inulin.

14. The method of claim 12 wherein at least a portion of the nutritional fortifying ingredient is a calcium material.

15. The method of claim 1 wherein step B includes adding with about 0.01% to 25% of nutritional fortifying ingredient selected from the group consisting of biologically active components, fiber, micro-nutrients, minerals, and mixtures thereof.

16. The method of claim 15 wherein step B is practiced with adding about 10 to 20% of sugar crystals to the blend.

17. The method of claim 1 additionally comprising the step of dividing the liquid confection blend into at least a first and a second sub-streams to form a first liquid confection blend sub-stream having a first color and a second liquid confection blend sub-stream and adding a colorant to the second seeded liquid confection blend sub-stream to form a second sub-stream having a second color.

18. The method of claim 17 wherein the foam structuring ingredient is gelatin.

19. The method of claim 18 wherein the ratio of first sub-stream to second sub-stream ranges from about 1:1.1 to 1:50.

20. The method of claim 17 wherein the step of dividing the liquid confection blend involves forming at least three unequal sub-streams.

21. The method of claim 17 additionally comprising the step of:

G. drying the pieces to a moisture content of about 1 to 5% to form dried aerated confection pieces.

22. The method of claim 17 additionally comprising the step of:

J. drying the pieces to a moisture content of about 10 to 15% to form soft aerated confection pieces.

23. The method of claim 17 wherein the pieces have a moisture content of about 10 to 15%.

24. The method of claim 17 wherein at least a portion of the cooling step is practiced in a swept surface heat exchanger.

25. The method of claim 17 wherein step A comprises the sub-steps of 1) providing a concentrated hot clear sugar syrup, and 2) cooling the clear sugar syrup to form a clear cooled sugar syrup having a temperature ranging from about 80 to 185° F. (26 to 85° C.).

26. The method of claim 25 wherein at least a portion of the sub step of cooling is practiced in a twin screw extruder.

27. The method of claim 26 wherein the operating pressure within the twin screw extruder is about 0.1 to 10 psig.

28. The product prepared by the process of claim 25.

29. The product prepared by the process of claim 26.

30. The method of claim 1 wherein at least a portion of step A is practiced in a continuous mixing device having a heat transfer means.

31. The product prepared by the process of claim 30.

32. The method of claim 1 wherein step A is practiced in a continuous mode.

33. The method of claim 1 wherein step A is practiced in batch mode.

34. The method of claim 1 wherein step A is practiced in a semi-continuous mode.

35. The method of claim 1 wherein at least one step is practiced in a continuous mixing device having a heat transfer means.

36. The method of claim 35 wherein the continuous mixing device has a heat transfer means includes a means for heating.

37. The method of claim 35 wherein the continuous mixing device has a heat transfer means includes a means for cooling.

38. The method of claim 36 wherein the continuous mixing device includes an extrusion device having at least one screw.

39. The method of claim 38 wherein the extrusion device is a twin screw extruder.

40. The product prepared by the process of claim 38.

41. The method of claim 35 wherein step A is practiced in a continuous mixing device.

42. The method of claim 41 wherein step B is also practiced in a continuous mixing device.

43. The method of claim 42 wherein each continuous mixing device is an extruder having at least one screw.

44. The method of claim 43 herein at least one continuous mixing device is a twin screw extruder.

45. The method of claim 44 wherein each continuous mixing device is a twin screw extruder.

46. The method of claim 35 wherein step B is practiced in a continuous mixing device.

47. The method of claim 46 wherein the continuous mixing device is an extruder having at least one screw.

48. The method of claim 47 wherein the continuous mixing device is a twin screw extruder.

49. The method of claim 47 wherein steps A, B and C are each practiced in the same twin screw extruder.

50. The method of claim 1 wherein step C is practiced in a twin screw extruder.

51. The product prepared by the process of claim 1.

52. A method for continuously forming a clear concentrated sugar syrup in a single vessel by continuously admixing to form a sugar syrup slurry:

1) a first source of a nutritive carbohydrate sweetener, wherein at least a portion of the first source is in the form of a dry particulate solid, 2) a second source of a nutritive carbohydrate sweetener in the form of a sugar syrup, 3) sufficient amounts of water to form a sugar syrup slurry having a moisture content of about 20 to 30%;

cooking the sugar syrup slurry with agitation and indirect heat to dissolve the solids, concentrating the sugar syrup by evaporating water as vapor and venting the vapor to form a concentrated clear syrup having a moisture content of about 2 to 18% and a discharge temperature of about 220 to 320° F. (104.5 to 160° C.), wherein the residence time ("$R_t$") of the syrup within the vessel ranges from about 1 to 5 minutes.

53. The method of claim 52 wherein at least a portion of the first source of a nutritive carbohydrate sweetener is sucrose.

54. The method of claim 53 wherein at least a portion of the concentrating substep is practiced under a partial vacuum.

55. The method of claim 54 wherein at least a portion of the nutritive carbohydrate sweetener is provided by a fruit material.

56. The method of claim 55 wherein at least a portion of the nutritive carbohydrate sweetener is provided by a a fructo oligo saccharide.

57. A method of preparing a liquid confection blend seeded with crystalline sugar and useful for the preparation of aerated confections, comprising the steps of:
  A. providing a liquid confection blend comprising:
    1. 50% to 94% of nutritive carbohydrate sweeteners,
    2. 1 to 30% of an aerated confection foam structuring agent, and
    3. about 5 to 20% moisture;
  B. conveying the clear concentrated sugar syrup while maintaining the temperature within 5° F. of the discharge temperature to prevent crystallization;
  C. seeding the liquid sugar slurry confection blend with
    1. dry sugar crystals in an amount ranging from 1 to 30% (dry weight basis) having a particle size of less than 150 microns, and,
    2. about 0.1% to 25% of nutritional fortifying ingredient in the form of a dry particulate selected from the group consisting of biologically active components, micronutrients, fiber, and mixtures thereof, said nutritional fortifying ingredient having a particle size distribution such that 90% have a particle size of less than 400 microns to form a fortified liquid confection blend.

58. The method of claim 57 wherein the sugar syrup has a temperature of about 50 to 185° F.

59. The method of claim 58 wherein step C is practiced to add about 5 to 20% of sugar crystals to the liquid confection blend.

60. The method of claim 59 wherein the sugar has a particle size of less than 300 µm.

61. The method of claim 59 wherein the liquid blend comprises about 1 to 4% structuring agent and wherein the structuring agent is gelatin.

62. The method of claim 57 additionally comprising the step of:
  aerating the confection blend to form an aerated foam;
  extruding the aerated foam at a temperature of about 90 to 180° F. (32 to 82° C.) to form an aerated confection extrudate;
  cooling the extrudate to solidify the confection to form a set aerated confection extrudate; and, forming the set aerated confection extrudate into pieces.

63. The method of claim 62 additionally comprising the step of:
  drying the pieces to a moisture content of about 1 to 5% to form dried aerated confection pieces.

64. The method of claim 62 additionally comprising the step of drying the pieces to a moisture content of about 10 to 15% to form soft aerated confection pieces.

65. The method of claim 64 additionally comprising the step of drying the pieces to a moisture content of about 1 to 5% to form dried aerated confection pieces.

* * * * *